United States Patent

Bruckstein et al.

Patent Number: 6,091,394
Date of Patent: *Jul. 18, 2000

[54] TECHNIQUE FOR HOLOGRAPHIC REPRESENTATION OF IMAGES

[75] Inventors: Alfred M. Bruckstein, Summit; Robert J. Holt, Scotch Plains; Arun N. Netravali, Westfield, all of N.J.

[73] Assignee: Lucent Technologies Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/923,480

[22] Filed: Sep. 4, 1997

[51] Int. Cl.⁷ .................................................. G09G 05/32
[52] U.S. Cl. ........................ 345/112; 358/263; 358/261.3; 358/426; 358/138
[58] Field of Search ............................... 358/263, 261.3, 358/426, 138, 135, 449, 459, 133, 260, 335; 382/210, 302, 56; 359/15, 16, 29, 32, 35; 345/903, 112

[56] References Cited

U.S. PATENT DOCUMENTS

| | | | |
|---|---|---|---|
| 3,627,400 | 12/1971 | Caulfield | 359/25 |
| 4,261,018 | 4/1981 | Knowlton | 358/263 |
| 4,698,689 | 10/1987 | Tzou | 358/250 |
| 5,293,434 | 3/1994 | Feig et al. | 382/725 |
| 5,335,088 | 8/1994 | Fan | 358/429 |
| 5,341,229 | 8/1994 | Rowan | 359/10 |
| 5,481,306 | 1/1996 | Senso et al. | 348/383 |
| 5,589,956 | 12/1996 | Morishima et al. | 359/15 |
| 5,694,488 | 12/1997 | Hartmann | 382/210 |
| 5,729,484 | 3/1998 | Mack et al. | 364/725 |
| 5,805,117 | 9/1998 | Mazurek et al. | 345/1 |
| 5,809,231 | 9/1998 | Yokoyama et al. | 395/200.3 |
| 5,880,856 | 3/1999 | Ferriere | 358/432 |

OTHER PUBLICATIONS

K. Knowlton, "Progressive Transmission of Grey–Scale and Binary Pictures by Simple, Efficient, and Lossless Encoding Schemes," *Proceedings of the IEEE*, vol. 68, No. 7, Jul. 1980, pp. 885–896.

A. Frank et al., "Progressive Image Transmission Using a Growth–Geometry Coding," *Proceedings of the IEEE*, vol. 68, No. 7, Jul. 1980, pp. 897–909.

S. Tanimoto et al., "A Hierarchical Data Structure for Picture Processing," *Computer Graphics and Image Processing 4*, 1975, pp. 104–119.

P. Burt et al., "The Laplacian Pyramid as a Compact Image Code," *IEEE Transactions on Communications*, vol. Com. 31, No. 4, Apr. 1983, pp. 532–540.

*Primary Examiner*—William A. Cuchlinski, Jr.
*Assistant Examiner*—Marthe Y. Marc-Coleman
*Attorney, Agent, or Firm*—Alex L. Yip

[57] ABSTRACT

In a communications system, an image to be transmitted is holographically represented in accordance with the invention. Relying on a portion of the holographic representation selected from any part thereof, a receiver can provide an overall version of the transmitted image. This overall version is successively refined as the size of the aggregate portion of the representation received by the receiver increases.

42 Claims, 6 Drawing Sheets

FIG. 2A
200

POSN 0   POSN 1
(0,0)    (0,1)

| A | B |
|---|---|
| C | D |

(1,0)    (1,1)
POSN 2   POSN 3

FIG. 2B
250

| 0 | 2 |
|---|---|
| 3 | 1 |

FIG. 3A
300

| 0  | 8  | 2  | 10 |
|----|----|----|----|
| 12 | 4  | 14 | 6  |
| 3  | 11 | 1  | 9  |
| 15 | 7  | 13 | 5  |

FIG. 3B

SQUARE 0         SQUARE 1

| 0 |  |
|---|---|
|   |  |

| 2 |  |
|---|---|
|   |  |

| 3 |  |
|---|---|
|   |  |

| 1 |  |
|---|---|
|   |  |

SQUARE 2         SQUARE 3

FIG. 3C

|   |   |   |   |
|---|---|---|---|
| 0 |   | 2 |   |
|   | 4 |   | 6 |
| 3 |   | 1 |   |
|   | 7 |   | 5 |

FIG. 3D

|   |    |   |    |
|---|----|---|----|
| 0 | 8  | 2 | 10 |
|   | 4  |   | 6  |
| 3 | 11 | 1 | 9  |
|   | 7  |   | 5  |

FIG. 4
400

| 0  | 32 | 8  | 40 | 2  | 34 | 10 | 42 |
|----|----|----|----|----|----|----|----|
| 48 | 16 | 56 | 24 | 50 | 18 | 58 | 26 |
| 12 | 44 | 4  | 36 | 14 | 46 | 6  | 38 |
| 60 | 28 | 52 | 20 | 62 | 30 | 54 | 22 |
| 3  | 35 | 11 | 43 | 1  | 33 | 9  | 41 |
| 51 | 19 | 59 | 27 | 49 | 17 | 57 | 25 |
| 15 | 47 | 7  | 39 | 13 | 45 | 5  | 37 |
| 63 | 31 | 55 | 23 | 61 | 29 | 53 | 21 |

| 0 | 128 | 32 | 160 | 8 | 136 | 40 | 168 | 2 | 130 | 34 | 162 | 10 | 138 | 42 | 170 |
|---|---|---|---|---|---|---|---|---|---|---|---|---|---|---|---|
| 192 | 64 | 224 | 96 | 200 | 72 | 232 | 104 | 194 | 66 | 226 | 98 | 202 | 74 | 234 | 106 |
| 48 | 176 | 16 | 144 | 56 | 184 | 24 | 152 | 50 | 178 | 18 | 146 | 58 | 186 | 26 | 154 |
| 240 | 112 | 208 | 80 | 248 | 120 | 216 | 88 | 242 | 114 | 210 | 82 | 250 | 122 | 218 | 90 |
| 12 | 140 | 44 | 172 | 4 | 132 | 36 | 164 | 14 | 142 | 46 | 174 | 6 | 134 | 38 | 166 |
| 204 | 76 | 236 | 108 | 196 | 68 | 228 | 100 | 206 | 78 | 238 | 110 | 198 | 70 | 230 | 102 |
| 60 | 188 | 28 | 156 | 52 | 180 | 20 | 148 | 62 | 190 | 30 | 158 | 54 | 182 | 22 | 150 |
| 252 | 124 | 220 | 92 | 244 | 116 | 212 | 84 | 254 | 126 | 222 | 94 | 246 | 118 | 214 | 86 |
| 3 | 131 | 35 | 163 | 11 | 139 | 43 | 171 | 1 | 129 | 33 | 161 | 9 | 137 | 41 | 169 |
| 195 | 67 | 227 | 99 | 203 | 75 | 235 | 107 | 193 | 65 | 225 | 97 | 201 | 73 | 233 | 105 |
| 51 | 179 | 19 | 147 | 59 | 187 | 27 | 155 | 49 | 177 | 17 | 145 | 57 | 185 | 25 | 153 |
| 243 | 115 | 211 | 83 | 251 | 123 | 219 | 91 | 241 | 113 | 209 | 81 | 249 | 121 | 217 | 89 |
| 15 | 143 | 47 | 175 | 7 | 135 | 39 | 167 | 13 | 141 | 45 | 173 | 5 | 133 | 37 | 165 |
| 207 | 79 | 239 | 111 | 199 | 71 | 231 | 103 | 205 | 77 | 237 | 109 | 197 | 69 | 229 | 101 |
| 63 | 191 | 31 | 159 | 55 | 183 | 23 | 151 | 61 | 189 | 29 | 157 | 53 | 181 | 21 | 149 |
| 255 | 127 | 223 | 95 | 247 | 119 | 215 | 87 | 253 | 125 | 221 | 93 | 245 | 117 | 213 | 85 |

| 0 | 4 | 6 | 10 |
|---|---|---|---|
| 8 | 12 | 14 | 2 |
| 15 | 3 | 9 | 13 |
| 7 | 11 | 1 | 5 |

FIG. 6B

| 0 |   |   |   |
|---|---|---|---|
|   |   |   | 2 |
|   | 3 |   |   |
|   |   |   | 1 |

FIG. 6C

| 0 | 4 |
|---|---|
|   |   |

| 6 |   |
|---|---|
|   | 2 |

|   | 3 |
|---|---|
| 7 |   |

|   |   |
|---|---|
| 1 | 5 |

FIG. 6D

| 0 | 4 |
|---|---|
| 8 |   |

| 6 | 10 |
|---|----|
|   | 2  |

|   | 3  |
|---|----|
| 7 | 11 |

| 9 |   |
|---|---|
| 1 | 5 |

| 0 | 16 | 36 | 52 | 6 | 22 | 26 | 42 |
|---|---|---|---|---|---|---|---|
| 32 | 48 | 4 | 20 | 38 | 54 | 58 | 10 |
| 56 | 8 | 28 | 44 | 62 | 14 | 34 | 50 |
| 24 | 40 | 60 | 12 | 30 | 46 | 2 | 18 |
| 47 | 63 | 19 | 35 | 41 | 57 | 13 | 29 |
| 15 | 31 | 51 | 3 | 9 | 25 | 45 | 61 |
| 55 | 7 | 11 | 27 | 49 | 1 | 21 | 37 |
| 23 | 39 | 43 | 59 | 17 | 33 | 53 | 5 |

| 0 | 64 | 144 | 208 | 100 | 164 | 244 | 52 | 6 | 70 | 150 | 214 | 90 | 154 | 170 | 234 |
|---|---|---|---|---|---|---|---|---|---|---|---|---|---|---|---|
| 128 | 192 | 16 | 80 | 228 | 36 | 116 | 180 | 134 | 198 | 22 | 86 | 218 | 26 | 42 | 106 |
| 224 | 32 | 112 | 176 | 132 | 196 | 20 | 84 | 230 | 38 | 118 | 182 | 58 | 122 | 202 | 10 |
| 96 | 160 | 240 | 48 | 4 | 68 | 148 | 212 | 102 | 166 | 246 | 54 | 186 | 250 | 74 | 138 |
| 184 | 248 | 72 | 136 | 92 | 156 | 172 | 236 | 190 | 254 | 78 | 142 | 98 | 162 | 242 | 50 |
| 56 | 120 | 200 | 8 | 220 | 28 | 44 | 108 | 62 | 126 | 206 | 14 | 226 | 34 | 114 | 178 |
| 216 | 24 | 40 | 104 | 60 | 124 | 204 | 12 | 222 | 30 | 46 | 110 | 130 | 194 | 18 | 82 |
| 88 | 152 | 168 | 232 | 188 | 252 | 76 | 140 | 94 | 158 | 174 | 238 | 2 | 66 | 146 | 210 |
| 111 | 175 | 255 | 63 | 83 | 147 | 163 | 227 | 105 | 169 | 249 | 57 | 13 | 77 | 157 | 221 |
| 239 | 47 | 127 | 191 | 211 | 19 | 35 | 99 | 233 | 41 | 121 | 185 | 141 | 205 | 29 | 93 |
| 143 | 207 | 31 | 95 | 51 | 115 | 195 | 3 | 137 | 201 | 25 | 89 | 237 | 45 | 125 | 189 |
| 15 | 79 | 159 | 223 | 179 | 243 | 67 | 131 | 9 | 73 | 153 | 217 | 109 | 173 | 253 | 61 |
| 183 | 247 | 71 | 135 | 11 | 75 | 155 | 219 | 177 | 241 | 65 | 129 | 85 | 149 | 165 | 229 |
| 55 | 119 | 199 | 7 | 139 | 203 | 27 | 91 | 49 | 113 | 193 | 1 | 213 | 21 | 37 | 101 |
| 215 | 23 | 39 | 103 | 235 | 43 | 123 | 187 | 209 | 17 | 33 | 97 | 53 | 117 | 197 | 5 |
| 87 | 151 | 167 | 231 | 107 | 171 | 251 | 59 | 81 | 145 | 161 | 225 | 181 | 245 | 69 | 133 |

TECHNIQUE FOR HOLOGRAPHIC REPRESENTATION OF IMAGES

FIELD OF THE INVENTION

The invention relates to systems and methods for processing images, and more particularly to systems and methods for sampling and organizing image data to achieve image representations conducive to efficient communications and storage in a distributed environment.

BACKGROUND OF THE INVENTION

Video media plays an important role in communications nowadays and is, in fact, the major contributing factor of the popularity of such technologies as the World Wide Web (WWW), high definition television (HDTV) and video conferencing.

However, in a typical application, transmission of images requires much higher bandwidth than that of, say, textual data or audio signals. Prior art techniques directed to representing and encoding images to efficiently utilize limited bandwidth have been developed. These prior art techniques include well-known progressive image transmission techniques such as those described in: K. Knowlton, "Progressive Transmission of Grey-Scale and Binary Pictures by Simple, Efficient, and Lossless Encoding Schemes," *Proceedings of the IEEE*, Vol. 68, No. 7, July 1980, pp. 885–896; and A. Frank et al., "Progressive Image Transmission Using a Growth-Geometry Coding," *Proceedings of the IEEE*, Vol. 68, No. 7, July 1980, pp. 897–909.

In general, in progressive image transmission, a coarse rendition of an image is first transmitted to give a receiver an early impression of the image content. The subsequent transmission provides the image detail of progressively finer resolution. Thus, the receiver may terminate transmission of the image to save bandwidth as soon as the image content is recognized, or as soon as it becomes evident that the image is not of interest. Thus, in progressive transmission, a hierarchy of coarse to relatively fine resolution versions of the image is developed. The coarse resolution version contains important features to which less important details are progressively added to achieve the relatively fine resolution versions.

The above hierarchy may be realized using a hierarchical (or pyramid) data structure to represent an image. For example, one such data structure is described in S. Tanimoto et al., "A Hierarchical Data Structure for Picture Processing," *Computer Graphics and Image Processing* 4, 1975, pp. 104–119. The hierarchy in question may also be accomplished by encoding an image in a certain manner. For example, using an encoding scheme described in P. Burt et al., "The Laplacian Pyramid as a Compact Image Code," *IEEE Transactions on Communications*, Vol. Com 31, No. 4, April 1983, one can effectively sample an image with Laplacian operators of many scales. The resulting code representing the image attains a pyramid structure. To achieve the progressive transmission, the topmost level of the pyramid code is sent first to provide an initial coarse image in the receiver. The next level of the code is then transmitted and added to the previous level thereof to enhance the received image, and so on.

SUMMARY OF THE INVENTION

However, we have identified at least one major disadvantage of using the traditional progressive image transmission techniques described above. This disadvantage stems from their requirement of transmitting image information of varying importance. It is well known that transmitted information would likely be corrupted or even lost when it traverses an imperfect communication channel, which is typical. When the relatively important image information, e.g., feature information, is corrupted or lost during the progressive image transmission, it causes disproportionately detrimental effects on recovery of the image, and sometimes proves to be fatal to the whole recovery process.

In accordance with the invention, an image to be transmitted is holographically represented. A portion from any part of the holographic representation contains information representing each part of the image in equal proportion (or in a symmetric manner). Image recovery based on such a portion provides a global (or an overall) view of the entire image. The degradation of the recovered image with respect to the original image depends upon the size of the aggregate portion of the holographic representation received. The larger the size of the representation received, the lower the degradation is. The successive refinement of the recovered image is insensitive to the order in which portions of the representation are made available. Advantageously, unlike the prior art, corruption or loss of any portion of the representation during transmission here would not derail the image recovery process.

BRIEF DESCRIPTION OF THE DRAWING

In the drawing,

FIG. 2A illustrates an image frame to be transmitted by the system of FIG. 1;

FIG. 2B illustrates a sampling plan for sampling the image frame of FIG. 2A;

FIG. 3A illustrates a second sampling plan pursuant to a regular holographic sampling scheme in accordance with the invention;

FIGS. 3B through 3D illustrate various stages of construction of the second sampling plan;

FIGS. 4 and 5 respectively illustrate third and fourth sampling plans pursuant to the regular holographic sampling scheme;

FIG. 6A illustrates a fifth sampling plan pursuant to a psuedo-random holographic sampling scheme in accordance with the invention;

FIGS. 6B through 6D illustrate various stage of construction of the fifth sampling plan;

FIGS. 7 and 8 respectively illustrate sixth and seventh sampling plans pursuant to the psuedo-random holographic sampling scheme.

DETAILED DESCRIPTION

Figure 1:
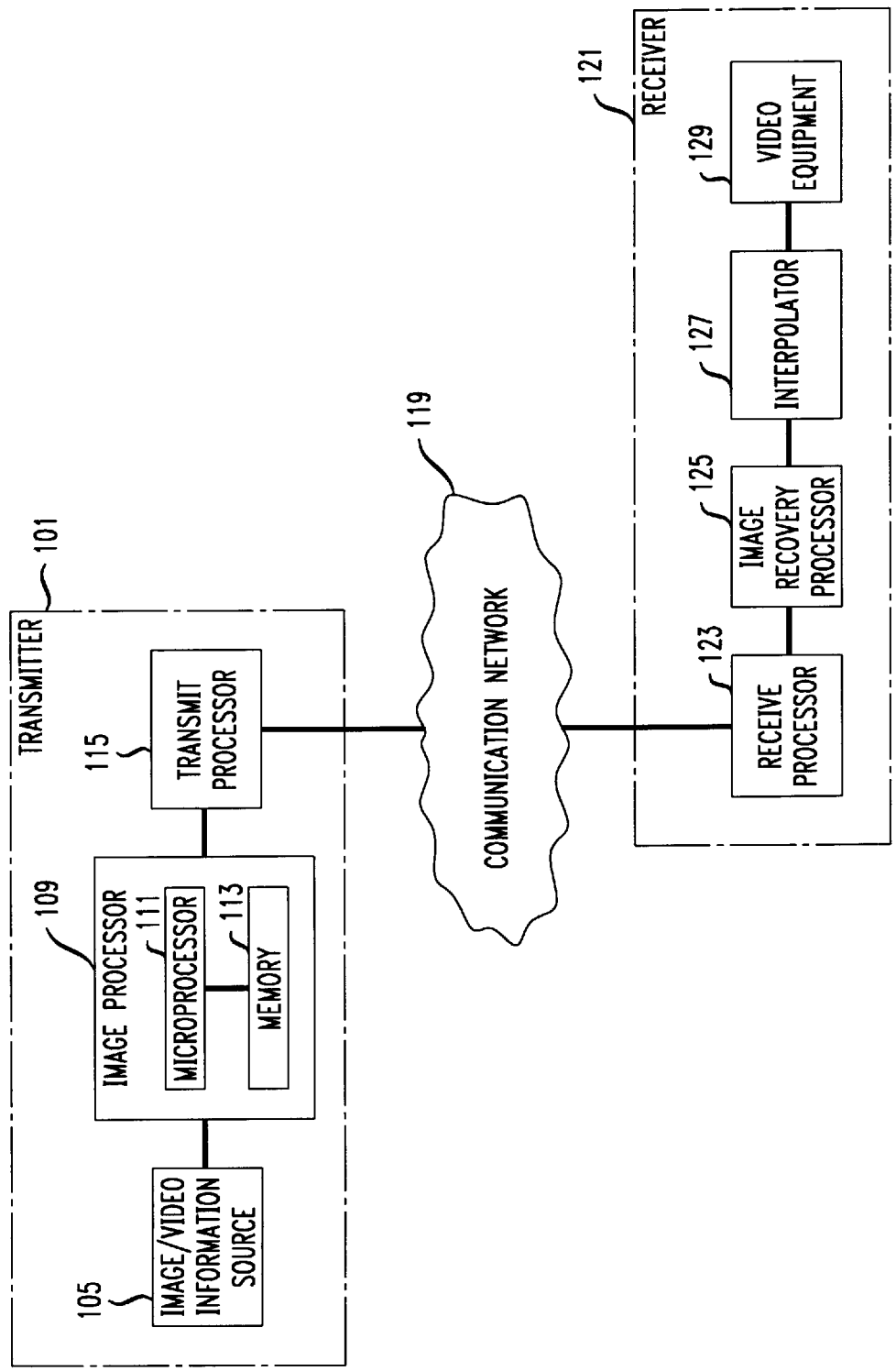
FIG. 1 illustrates an image communications system in accordance with the invention.

FIG. 1 illustrates image communications system 100 embodying the principles of the invention. System 100 includes transmitter 101, communication network 119 and receiver 121 for communicating visual information, and may be incorporated in a larger system rendering services such as video conferencing, HDTV, etc.

In transmitter 101, image/video information source 105 which may be standard digital video equipment provides a series of digitized video image frames to image processor 109 in accordance with the invention. In a conventional manner, each video image frame comprises a multiplicity of pixels which are arranged in a 2-dimensional format corresponding to the original 2-dimensional image. Without loss of generality, each image frame in this instance has $2^N \times 2^N$ pixels arranged in a square format, where N is an integer greater than zero. For transmission of each image frame, image processor 109 processes the pixels therein pursuant to an order specified by a sampling plan to be described.

Traditionally, to efficiently utilize bandwidth to communicate video images, the images are transmitted in accordance with a progressive image transmission technique. This technique requires a realization of a hierarchy of coarse to relatively fine resolution versions of the image to be transmitted. The coarse resolution version of the image containing important features is first transmitted, followed by information on decreasingly important details of the image. Accordingly, the coarse image is first received to which less important details are progressively added to enhance the received image.

However, we have identified at least one major disadvantage of using the traditional progressive image transmission technique. This disadvantage stems from its requirement of transmitting image information of varying importance. It is well known that transmitted information would likely be corrupted or even lost when it traverses an imperfect communication channel, which is typical. When the relatively important image information, e.g., feature information, is corrupted or lost during the progressive image transmission, it causes disproportionately detrimental effects on recovery of the image, and sometimes proves to be fatal to the whole recovery process.

The invention overcomes the prior art limitations by "holographically" representing an image to be transmitted. Although the inventive image representation does not simulate the process of optical holography, it achieves an important property of an optical hologram, namely, a uniform distribution of image information, as opposed to the hierarchical information distribution as in the prior art.

As is well known, one can reconstruct a scene from arbitrary portions of an optical hologram encoding that scene. The quality of the reconstruction depends on the size of the hologram portion used, but is independent of its location in the hologram. A small portion of the hologram provides a blurred scene reconstruction, and as the area of the portion grows, the scene is reconstructed with more and more detail. The information on the scene is homogeneously distributed over its holographic representation in such a way that even a small portion of the hologram affords a global view of the image, albeit lacking in detail. Thus, an optical hologram of a scene is a representation which makes possible a successive refinement scheme for information retrieval and transmission, insensitive to the order in which the portions of the representation become available.

Similarly, as fully described below, the inventive holographic representation of an image allows successive refinement of the image at the receiving end. In the inventive representation, the image information is arranged in such a way that portions of the representation selected from any parts thereof individually provide respective global (or overall) views of the entire image and, together synergistically provide a finer resolution version thereof. Because of the holographic representation, the transmitted image information is of equal importance or unimportance throughout the transmission. As a result, the degradation of the recovered image with respect to the original image depends upon the size of the aggregate portion of the holographic representation received. The larger the size of the representation received, the lower the degradation is. In addition, the successive refinement of the recovered image is insensitive to the order in which the portions of the representation are made available. Advantageously, unlike the prior art, corruption or loss of any part of transmitted information here would not derail the image recovery process.

In order to fully appreciate the invention, certain nomenclature needs to be developed here. For that purpose, let's first consider a digitized image frame having 2×2 pixels from source 105. FIG. 2A illustrates one such a image frame 200 which comprises four pixels denoted A, B, C, and D, respectively. Generically, a pixel in a digitized image frame located in the $i^{th}$ row and $j^{th}$ column thereof is said to be occupying a position (i,j) in the image frame, where i and j are each an integer greater than or equal to zero. In this instance, pixel A occupies position (0,0) of image frame 200 and thus may also be referred to as "pixel (0,0);" pixel B occupies position (0,1) thereof and thus may also be referred to as "pixel (0,1);" pixel C occupies position (1,0) thereof and thus may also be referred to as "pixel (1,0);" and pixel D occupies position (1,1) thereof and thus may also be referred to as "pixel (1,1)."

Alternatively, in the case of an image frame such as image frame 200 having 2×2 pixels, by treating the row index i and column index j as the most significant bit (MSB) and the least significant bit (LSB) of a binary number, respectively, one may describe the position of a pixel by its decimal equivalent. That is, alternatively, pixel A in this instance is said to be occupying POSN 0 (corresponding to (i,j)=(0,0)) of image frame 200, pixel B occupying POSN 1 (corresponding to (i,j)=(0,1)) thereof, pixel C occupying POSN 2 (corresponding to (i,j)=(1,0)) thereof, and pixel D occupying POSN 3 (corresponding to (i,j)=(1,1)) thereof.

Image processor 109 in FIG. 1 includes microprocessor 111 and memory 113. Instructed by a control program which is stored in memory 113, microprocessor 111 processes the pixels in each image frame from source 105 in an order specified by a sampling plan, which is also stored in memory 113. By way of example, FIG. 2B illustrates sampling plan 250 pursuant to which pixels A, B, C and D of image frame 200 are processed. As shown in FIG. 2B, sampling plan 250 is formatted similarly to image frame 200, except that an ordering index "0" takes the place of pixel A; an ordering index "2" takes the place of pixel B; an ordering index "3" takes the place of pixel C; and an ordering index "1" takes the place of pixel D. Such a sampling plan signifies that pixels A, D, B and C are processed in that order corresponding to the sequential order of the ordering indices "0", "1", "2" and "3" taking their respective places. In other words, according to sampling plan 250, pixel (0,0) (i.e., pixel A) is first processed by microprocessor 111, followed by pixel (1,1) (i.e., pixel D), pixel (0,1) (i.e., pixel B), and pixel (1,0) (i.e., pixel C).

In accordance with the invention, image pixels are sampled in a certain order such that the selected samples at any instant are spatially distributed as uniformly as possible over the image frame. As evidenced below, we have developed an ordering of pixels for which certain $2^M \times 2^M$ squares from the original image frame having $2^N \times 2^N$ pixels are guaranteed to be represented by any sequence of $4^{N-M}$ contiguous pixel samples, where $0 < M \leq N$. Let $\square^M_{pq}$ denote a $2^M \times 2^M$ square array of pixels whose upper left corner is at row $2^M p$ and column $2^M q$. With $p \in \{0, 1, \ldots, 2^{N-M-1}\}$ and $q \in \{0, 1, \ldots, 2^{N-M-1}\}$, the original image frame may be divided into $4^{N-M}$ disjoint squares, $\square^M_{pq}$'s. Each disjoint square $\square^M_{pq}$ comprises the pixels with row index $j \in \{2^M p, \ldots, 2^M(p+1)-1\}$ and column index $j \in \{2^M q, \ldots, 2^M(q+1)-1\}$.

FIG. 3A illustrates sampling plan 300 in accordance with the invention for processor 109 to sample an image frame having 4×4 pixels from source 105 to achieve a holographic representation of the image. FIGS. 3B through 3D illustrate various stages of construction of sampling plan 300. As shown in FIG. 3B, the sampling plan formatted similarly to the image frame is divided into four 2×2 squares, namely, square 0 corresponding to $\square^1_{00}$, square 1 corresponding to $\square^1_{01}$, square 2 corresponding to $\square^1_{10}$, and square 3 corresponding to $\square^1_{11}$.

In this example, to realize the desired holographic properties, the corresponding pixels in the respective 2×2 squares are selected for processing in an order pursuant to sampling plan 250. As described before, sampling plan 250 specifies that the selected pixels are from POSN 0, POSN 3, POSN 1, and POSN 2 of a square in that order. It should be noted that this (0, 3, 1, 2) ordering, in short, is used here to select the 2×2 squares as well.

Specifically, in constructing sampling plan 300, the upper left corners (i.e., POSN 0) of squares 0, 3, 1 and 2 are first filled with ordering indices "0" through "3," respectively, as shown in FIG. 3B. Second, the lower right corners (i.e., POSN 3) of squares 0, 3, 1 and 2 are filled with ordering indices "4" through "7," respectively, as shown in FIG. 3C. Third, the upper right corners (i.e., POSN 1) of squares 0, 3, 1, and 2 are filled with ordering indices "8" through "11," respectively, as shown in FIG. 3D. Finally, the lower left corners (i.e., POSN 2) of squares 0, 3, 1 and 2 are filled with ordering indices "12" through "15," respectively, resulting in sampling plan 300 in FIG. 3A.

Thus, for example, according to sampling plan 300, microprocessor 111 processes for transmission the 16 pixels in each image frame in the following order: pixel (0,0) corresponding to the ordering index Gore in the sampling plan, followed by pixel (2,2) corresponding to the ordering index "1," pixel (0,2) corresponding to the ordering index "2,"..., and pixel (3,0) corresponding to the ordering index "15." In effect, the original image is holographically represented in accordance with the invention by a sequence comprising pixel (0,0), pixel (2,2), pixel (0,2), ..., and pixel (3,0) in that order.

The above approach can be readily extended to construct a sampling plan of a higher order. For example, to construct a sampling plan for an image frame having 8×8 pixels, the sampling plan may be divided into sixteen disjoint 2×2 squares. In constructing the plan, the squares may be selected in an order pursuant to sampling plan 300, and the selection of the pixels within the respective squares may follow the order specified by sampling plan 250. This construction results in sampling plan 400 in FIG. 4.

Specifically, similar to the above construction of sampling plan 300, construction of sampling plan 400 calls for first indexing the 16 upper left corners of the respective 2×2 squares (selected in the order according to sampling plan 300) with "0" through "15," respectively. Second, the 16 lower right corners thereof are indexed "16" through "31," respectively. Third, the 16 upper right corners thereof are indexed "32" through "47," respectively. Finally, the 16 lower left corners thereof are indexed "48" through "63," respectively.

It can be shown that in general when an image frame having $2^N \times 2^N$ pixels is divided into $4^{N-M}$ disjoint $2^M \times 2^M$ squares $\square^M_{pq}$'s, any sequence of $4^{N-M}$ pixels successively selected pursuant to a sampling plan in accordance with the invention comprises a sample from each $\square^M_{pq}$. This sequence may "wrap around" so that the pixel indexed "0" may be considered to follow the pixel indexed "$4^{N-1}$." As an illustration, FIG. 5 shows sampling plan 500 in accordance with the invention which is constructed based on sampling plans 400 and 250, with N=4 and M=1. As shown in FIG. 5, sampling plan 500 comprises 64 2×2 squares, and any sequence of 64 pixels selected successively, say, the sequence with indices 197–255 and 0–4 (shown in italics) in the sampling plan, comprises a sample from each of the 64 2×2 squares. It should also be noted that any sequence of 2×2 squares selected successively are reasonably uniformly distributed over the entire image frame.

However, we have recognized that use of the above sampling plans may give rise to undesirable aliasing and/or Moiré effects on the transmitted image. These effects can be attributed to repeated use of the same sampling order. For example, according to each of sampling plans 300, 400 and 500, pixels in each disjoint 2×2 square of an image frame are always selected in the order of POSN 0, POSN 3, POSN 1, and POSN 2 thereof.

To reduce the aliasing and/or Moiré effects, a "pseudo-random" holographic sampling scheme has been designed. Unlike the above "regular" holographic sampling scheme using a particular ordering pattern with regularity, the pseudo-random scheme uses pseudo-random ordering sequences to select pixels. FIG. 6A illustrates sampling plan 600 for sampling an image frame having 4×4 pixels in accordance with the pseudo-random scheme.

Figures 6C, 6D:
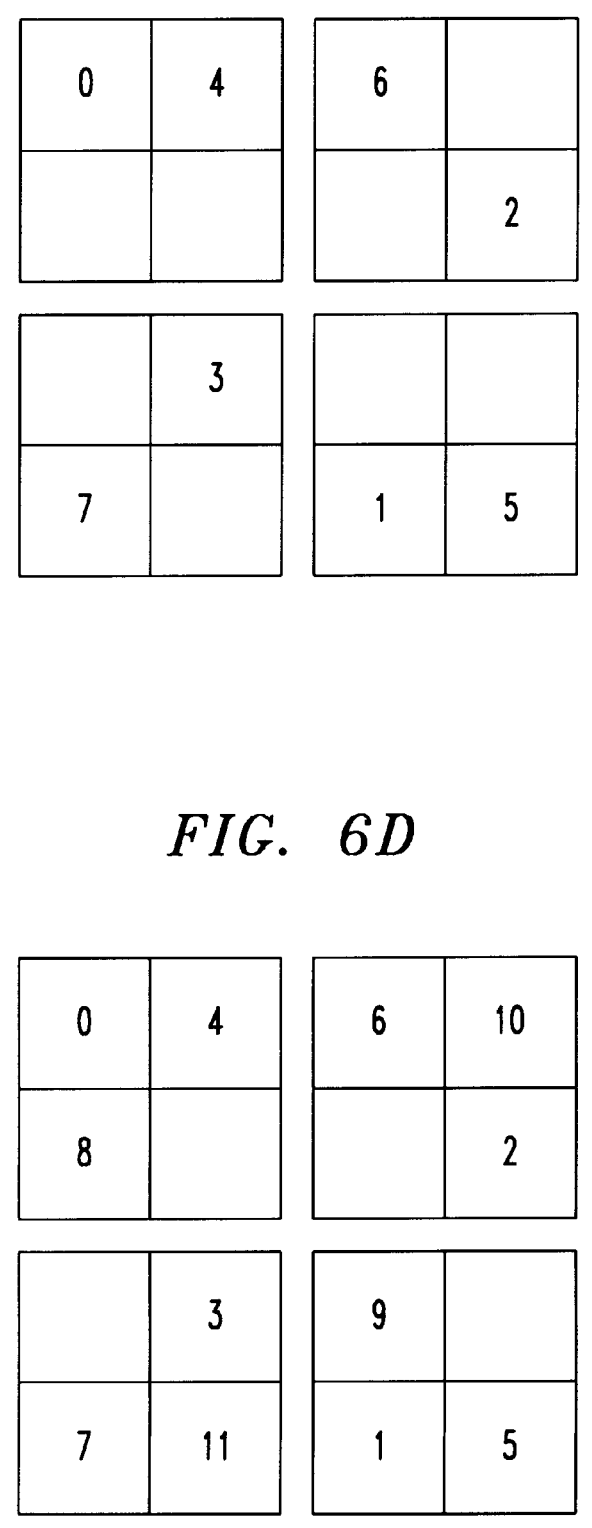

Specifically, in constructing sampling plan 600, a different pseudo-random ordering sequence is used in each phase of placing indices in plan 600. For example, in the first phase, indices "0" through "13" are placed in POSN 0, POSN 2, POSN 3 and POSN 1 of $\square^1_{00}$, $\square^1_{11}$, $\square^1_{01}$ and $\square^1_{10}$, respectively, as shown in FIG. 6B. In short, the pseudo-random ordering sequence used in the first phase is (0, 2, 3, 1). In the second phase, a new sequence (1, 3, 0, 2) is used. Accordingly, indices "4" through "7" are placed in POSN 1, POSN 3, POSN 0 and POSN 2 of $\square^1_{00}$, $\square^1_{11}$, $\square^1_{01}$ and $\square^1_{10}$, respectively, as shown in FIG. 6C. In the third phase, another sequence (2, 0, 1, 3) is used. Accordingly, indices "8" through "11" are placed in POSN 2, POSN 0, POSN 1 and POSN 3 of $\square^1_{00}$, $\square^1_{11}$, $\square^1_{01}$, and $\square^1_{10}$, respectively, as shown in FIG. 6D. In the final phase, based on yet another sequence (3, 1, 2, 0), indices "12" through "15" are placed in POSN 3, POSN 1, POSN 2 and POSN 0 of $\square^1_{00}$, $\square^1_{11}$, $\square^1_{01}$, and $\square^1_{10}$, respectively, resulting in sampling plan 600. In general, to randomize the ordering sequence, various permutations of {0, 1, 2, 3} are mixed as much as possible in its application.

A systematic way of constructing a $2^N \times 2^N$ sampling plan in accordance with the pseudo-random holographic sampling scheme will now be described. In such a construction, the following permutation functions on {0, 1, 2, 3} need to be defined:

$$
\begin{aligned}
h_{6\alpha}(0) &= 0 & h_{6\alpha}(1) &= 3 & h_{6\alpha}(2) &= 2 & h_{6\alpha}(3) &= 1 \\
h_{6\alpha+1}(0) &= 0 & h_{6\alpha+1}(1) &= 1 & h_{6\alpha+1}(2) &= 2 & h_{6\alpha+1}(3) &= 3 \\
h_{6\alpha+2}(0) &= 0 & h_{6\alpha+2}(1) &= 2 & h_{6\alpha+2}(2) &= 1 & h_{6\alpha+2}(3) &= 3 \\
h_{6\alpha+3}(0) &= 0 & h_{6\alpha+3}(1) &= 2 & h_{6\alpha+3}(2) &= 3 & h_{6\alpha+3}(3) &= 1 \\
h_{6\alpha+4}(0) &= 0 & h_{6\alpha+4}(1) &= 1 & h_{6\alpha+4}(2) &= 3 & h_{6\alpha+4}(3) &= 2 \\
h_{6\alpha+5}(0) &= 0 & h_{6\alpha+5}(1) &= 3 & h_{6\alpha+5}(2) &= 1 & h_{6\alpha+5}(3) &= 2,
\end{aligned}
\tag{1a}
$$

where $\alpha$ represents a nonnegative integer; and $h_{62}(4\gamma + m) = h_\beta(m)$ for all nonnegative integers $\beta$, $\gamma$ and $m$. To mix the above permutation functions, let $$g_{6\alpha}(n) = h_4(n) \quad g_{6\alpha+1}(n) = h_5(n) \quad g_{6\alpha+2}(n) = h_3(n) \tag{1b}$$
$$g_{6\alpha+3}(n) = h_1(n) \quad g_{6\alpha+4}(n) = h_0(n) \quad g_{6\alpha+5}(n) = h_2(n)$$

for all nonnegative integers α. Next, let $$f(n, a) = \left[ g_{a+1}(n) + \sum_{b=1}^{a} h_{a-b+1}(\lfloor n/4^b \rfloor) \right] \pmod{4}, \tag{2}$$

where $\lfloor \bullet \rfloor$ represents a standard floor function which takes the value of only the integer portion of the argument "●" expressed as a decimal, and define $$r(n, a) = \begin{cases} 0 & \text{if } f(n, a) \in \{0, 1\} \\ 1 & \text{if } f(n, a) \in \{2, 3\} \end{cases} \tag{3a}$$

$$c(n, a) = \begin{cases} 0 & \text{if } f(n, a) \in \{0, 2\} \\ 1 & \text{if } f(n, a) \in \{1, 3\}. \end{cases} \tag{3b}$$

Then the ordering index n is located at position (i,j) of the sampling plan, where $$i = \sum_{a=0}^{N-1} 2^{N-a-1} r(n, a) \tag{4a}$$

and $$j = \sum_{a=0}^{N-1} 2^{N-a-1} c(n, a). \tag{4b}$$

FIG. 7 illustrates sampling plan 700 (with N=3) derived using the above expressions. It should be noted that sampling plan 600 previously described may alternatively be derived using the same expressions.

Again, it can be shown that when an image frame having $2^N \times 2^N$ pixels is divided into $4^{N-M}$ disjoint $2^M \times 2^M$ squares $\square^M_{pq}$'s, any sequence of $4^{N-M}$ pixels selected successively according to an inventive sampling plan comprises a sample from each $\square^M_{pq}$. As an illustration, FIG. 8 shows sampling plan 800, with N=4 and M=1, constructed using expressions (1a), (1b), (2), (3a), (3b), (4a) and (4b). As shown in FIG. 8, sampling plan 800 comprises 64 2×2 squares, and any sequence of 64 pixels selected successively, say, the sequence with indices of 197–255 and 0–4 (shown in italics) in the sampling plan, comprises a sample from each of the 64 2×2 squares. In addition, any sequence of four pixels selected successively are reasonably uniformly distributed over the entire image.

It should be pointed out that the above regular holographic sampling scheme is a special case of the pseudo-random holographic sampling scheme. As such, the above expressions can also be used to construct sampling plans according to the regular holographic sampling scheme, except that expression (2) needs to be particularized and replaced by the following expression:

$$f(n, a) = h_5(\lfloor n/4^a \rfloor). \tag{5}$$

Thus, sampling plans 300, 400 and 500 previously described may alternatively be derived using expressions (1a), (1b), (5), (3a), (3b), (4a) and (4b).

Referring back to FIG. 1, as mentioned before, microprocessor 111 selects the pixels in each image frame from source 105 in an order specified by a sampling plan in accordance with the invention. It then generates data representing the selected pixels in the specified order, and provides the generated data to transmit processor 115 for transmission thereof. In theory, since the number of pixels in each image frame is known a priori, receiver 121 only needs information on the ordering index of any one received pixel to derive the ordering indices of all other received pixels to recover the image. However, in practice, the information on the ordering index is transmitted to receiver 121 from time to time, along with the data representing the associated pixel, for fear that such information may be occasionally corrupted or lost in communication network 119.

Thus, the pixel data provided by microprocessor 111 to transmit processor 115 is punctuated with data on the ordering indices associated with certain pixels. Transmit processor 115 formats the received data according to a protocol required by communication network 119. The formatted data is destined for receiver 121.

After receiving the formatted data from communication network 119, receive processor 123 recovers the transmitted pixel data and ordering index data. Based on the ordering index data and the same sampling plan used in processor 109, image recovery processor 125 performs the inverse function to processor 109. Specifically, it recovers the transmitted pixels and properly positions them in an image frame. It should be pointed out that because of the use of the holographic image representation in accordance with the invention, the recovered pixels are revenly distributed over such an image frame. As such, this image frame, albeit incompletely filled with the recovered pixels, provides at least a global view of the original image.

In any event, the incomplete image frame is passed by processor 123 on to interpolator 127. The latter performs an image smoothing function whereby the value of each unfilled pixel in the frame is assigned a weighted average of the values of its nearest neighbors which are available. For example, interpolator may use a sliding window large enough to guarantee at least one received pixel in each window within the frame centered at any pixel position. Because of the inventive holographic image representation, where each $2^M \times 2^M$ square is guaranteed to be represented by a sample in a sequence of $4^{N-M}$ contiguous pixels, a square window having a length of $2^{M+1}-1$ pixels is the smallest window which must contain at least one pixel from the sequence. When more than one received pixel appears in such a window, their values may be weighted by some function of their distance d to the center of the window, such as $1/d$ or $1/d^2$, and then averaged.

Interpolator 127 forwards the interpolated image frame to video equipment 129. Based on such an image frame, equipment 129 displays thereon an approximate version of the original transmitted image. The degradation of this approximate version with respect to the original image is dependent upon the size of the portion of the holographic image representation received. The larger the size of the portion received, the lower the degradation is.

A second embodiment in which an image is holographically represented based on Fourier transformation will now be described. In this embodiment, let I(x,y) represent an image on an X-Y plane to be holographically represented. In accordance with the invention, this image is regarded as the amplitude of the Fourier transform of its holographic representation H(u,v). Specifically, $$H(u, v) = \mathcal{F}^{-1}\{I(x,y)e^{jP(x,y)}\}$$

where $\mathcal{F}^{-1}\{\bullet\}$ represents the well known inverse Fourier transform operation, and P(x,y) is a random variable representing a phase value assigned to the image at point (x,y) in accordance with the invention. More particularly, P(x,y) is a random variable having a phase value uniformly distributed over $[-\pi, \pi]$, and is spatially uncorrelated, i.e., $E[P(x_1,y_1)P(x_2,y_2)]=0$ for $(x_1,y_1)\neq(x_2,y_2)$. In other words, in accordance with the invention, a "random phase" P(x,y) is artificially injected in the computation of the holographic representation of the image I(x,y).

It should be noted that the image represented by I(x,y) may be in a discrete or an analog form depending on the requirement of the system involved. In the case that I(x,y) represents an image in a discrete form, the above inverse Fourier transform used would be the standard discrete inverse Fourier transform. Otherwise, the standard continuous inverse Fourier transform would be used.

The image representation H(u,v) in accordance with the invention possesses holographic properties. It can be shown that a portion cropped from any part of the representation H(u,v) provides an overall version of I(x,y) after a Fourier transformation (discrete or continuous) is performed on the cropped portion. Again, the degradation of this overall version with respect to I(x,y) decreases as the size of the cropped portion used increases.

The foregoing merely illustrates the principles of the invention. It will thus be appreciated that a person skilled in the art will be able to devise numerous systems which, although not explicitly shown or described herein, embody the principles of the invention and are thus within its spirit and scope.

For example, image communications system 100 is disclosed herein in a form in which various system functions are performed by discrete functional blocks. However, any A one or more of these functions could equally well be embodied in an arrangement in which the functions of any one or more of those blocks or indeed, all of the functions thereof, are realized, for example, by one or more appropriately programmed processors.

We claim:

1. An image processing apparatus comprising:
    an interface for receiving a sequence of data points representative of a selected image, the selected image being divided into a predetermined number of partitions thereof, each data point being associated with one of the partitions, the data points being arranged in the sequence in such a manner that each predetermined number of successive data points in the sequence are associated with the predetermined number of partitions, respectively; and
    a processor responsive to the received data for generating a representation of the selected image.

2. The apparatus of claim 1 wherein the data points comprise a plurality of pixels in the selected image.

3. The apparatus of claim 2 wherein the pixels are selected to be placed in the sequence from the associated partitions in respective orders, two or more of the respective orders being identical.

4. The apparatus of claim 2 wherein the pixels are selected to be placed in the sequence from the associated partitions in respective orders, the respective orders being selected pseudo-randomly.

5. The apparatus of claim 1 wherein each partition is identical in size.

6. The apparatus of claim 2 wherein the pixels are arranaed in the sequence in accordance with a sampling plan.

7. The apparatus of claim 6 wherein the sampling plan is formatted similarly to the pixels in the selected image.

8. An image processing apparatus comprising:
    an interface for receiving data representative of a selected image; and
    a processor for performing a transformation on the data to generate a representation of the selected image, the transformation having a random phase introduced thereinto, a selected portion from any part of the representation including information representing each section of the selected image in substantially equal proportion.

9. The apparatus of claim 8 wherein the transformation includes an inverse Fourier transformation.

10. The apparatus of claim 8 wherein the data representative of the selected image is in an analog form.

11. An image recovery apparatus comprising:
    an interface for receiving a selected portion of a representation of a selected image, the selected image being divided into a predetermined number of partitions thereof, the representation being derived from a sequence of data points representative of the selected image, each data point being associated with one of the partitions, the data points being arranged in the sequence in such a manner that each predetermined number of successive data points in the sequence are associated with the predetermined number of partitions, respectively; and
    a processor responsive to the selected portion of the representation for recovering the selected image, degradation of the recovered image with respect to the selected image being a function of the size of the selected portion of the representation.

12. The apparatus of claim 11 wherein the degradation decreases as the size of the selected portion increases.

13. The apparatus of claim 11 wherein the data points comprise a plurality of pixels in the selected image.

14. The apparatus of claim 13 wherein the pixels are arranged in the sequence in a specified order.

15. The apparatus of claim 11 wherein the selected image is recovered by performing a Fourier transformation on the selected portion of the representation.

16. The apparatus of claim 11 wherein the selected image is in an analog form.

17. A communications system comprising:
    a processor responsive to a sequence of data points representative of a selected image for generating a representation of the selected image, the selected image being divided into a predetermined number of partitions, each data point being associated with one of the partitions, the data points being arranged in the sequence in such a manner that each predetermined number of successive data points in the sequence are associated with the predetermined number of partitions, respectively;
    a transmit element for transmitting at least a selected portion of the representation; and
    a receiver responsive to the transmitted portion of the representation for recovering the selected image, degradation of the recovered image with respect to the selected image being a function of the size of the transmitted portion.

18. The system of claim 17 wherein the data points comprise a plurality of pixels in the selected image.

19. The system of claim 18 wherein the pixels are arranged in the sequence in a specified order.

20. The system of claim 19 wherein the pixels are selected to be placed in the sequence from the associated partitions in respective orders, two or more of the respective orders being identical.

21. The system of claim 19 wherein the pixels are selected to be placed in the sequence from the associated partitions in respective orders, the respective orders being selected pseudo-randomly.

22. The system of claim 17 wherein the representation is generated by performing an inverse Fourier transformation on the selected data points.

23. The system of claim 22 wherein a random phase is introduced into the inverse Fourier transformation.

24. The system of claim 22 wherein the selected image is recovered by performing a Fourier transformation on the selected portion of the representation.

25. The system of claim 17 wherein the degradation decreases as the size of the selected portion increases.

26. The system of claim 17 wherein the image is in an analog form.

27. A method for image processing comprising:

receiving a sequence of data points representative of a selected image, the selected image being divided into a predetermined number of partitions thereof, each data point being associated with one of the partitions, the data points being arranged in the sequence in such a manner that each predetermined number of successive data points in the sequence are associated with the predetermined number of partitions, respectively; and generating, in response to the received data, a representation of the selected image.

28. The method of claim 27 wherein the data points comprise a plurality of pixels in the selected image.

29. The method of claim 28 wherein the pixels are arranged in the sequence in accordance with a sampling plan.

30. The method of claim 29 wherein the sampling plan is formatted similarly to the pixels in the selected image.

31. The method of claim 28 wherein the pixels are selected to be placed in the sequence from the associated partitions in respective orders, two or more of the respective orders being identical.

32. The method of claim 28 wherein the pixels are selected to be placed in the sequence from the associated partitions in respective orders, the respective orders being selected pseudo-randomly.

33. The method of claim 27 wherein each partition is identical in size.

34. An image processing method comprising:

receiving data representative of a selected image; and performing a transformation on the data to generate a representation of the selected image, the transformation having a random phase introduced thereinto, a selected portion from any part of the representation including information representing each section of the selected image in substantially equal proportion.

35. The method of claim 34 wherein the transformation includes an inverse Fourier transformation.

36. The method of claim 27 wherein the data representative of the selected image is in an analog form.

37. A method for image recovery comprising:

receiving a selected portion of a representation of a selected image, the selected image being divided into a predetermined number of partitions thereof, the representation being derived from a sequence of data points representative of the selected image, each data point being associated with one of the partitions, the data points being arranged in the sequence in such a manner that each predetermined number of successive data points in the sequence are associated with the predetermined number of partitions, respectively; and recovering the selected image in response to the selected portion of the representation, degradation of the recovered image with respect to the selected image being a function of the size of the selected portion of the representation.

38. The method of claim 37 wherein the degradation decreases as the size of the selected portion increases.

39. The method of claim 37 wherein the data points comprise a plurality of pixels in the selected image.

40. The method of claim 39 wherein the pixels are arranged in the sequence in a specified order.

41. The method of claim 37 wherein the selected image is recovered by performing a Fourier transformation on the selected portion of the representation.

42. The method of claim 37 wherein the selected image is in an analog form.

* * * * *